US012769655B2

(12) United States Patent
Sethuraman et al.

(10) Patent No.: US 12,769,655 B2
(45) Date of Patent: Oct. 20, 2026

(54) APPARATUS AND METHOD FOR PER MEMORY CHIP ADDRESSING

(71) Applicant: Intel Corporation, Santa Clara, CA (US)

(72) Inventors: Saravanan Sethuraman, Bayan Lepas (MY); George Vergis, Portland, OR (US); Tonia M. Rose, Wendell, NC (US); John R. Goles, Folsom, CA (US); John V. Lovelace, Driftwood, TX (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 17/747,950

(22) Filed: May 18, 2022

(65) Prior Publication Data

US 2022/0276958 A1 Sep. 1, 2022

(51) Int. Cl.
*G06F 12/06* (2006.01)

(52) U.S. Cl.
CPC .................................... *G06F 12/06* (2013.01)

(58) Field of Classification Search
CPC ... G06F 12/0684; G06F 12/06; G06F 12/0676
USPC ........................ 711/105, 1, 103, 12.089, 115
See application file for complete search history.

(56) References Cited

U.S. PATENT DOCUMENTS

| | | | | |
|---|---|---|---|---|
| 5,164,916 | A * | 11/1992 | Wu | H05K 1/141 365/174 |
| 5,860,134 | A | 1/1999 | Cowell | |
| 6,338,113 | B1 * | 1/2002 | Kubo | G06F 13/1684 713/324 |
| 7,619,912 | B2 * | 11/2009 | Bhakta | G11C 5/066 711/115 |
| 11,068,161 | B1 * | 7/2021 | Chen | G06F 13/105 |
| 2004/0128425 | A1 * | 7/2004 | Zitlaw | G06F 12/0684 711/E12.089 |
| 2009/0135638 | A1 | 5/2009 | Shimizu | |
| 2015/0339252 | A1 * | 11/2015 | Anderson | H04L 9/38 380/43 |
| 2018/0107591 | A1 * | 4/2018 | Smith | G06F 3/0613 |
| 2021/0141747 | A1 | 5/2021 | Jeong et al. | |
| 2021/0335406 | A1 | 10/2021 | Agrawal et al. | |

OTHER PUBLICATIONS

Partial European Search Report for Patent Application No. 23167698.2, Mailed Oct. 10, 2023, 14 pages.

(Continued)

*Primary Examiner* — Jared I Rutz
*Assistant Examiner* — Edward Waddy, Jr.
(74) *Attorney, Agent, or Firm* — Compass IP Law PC

(57) ABSTRACT

A memory chip is described. The memory chip includes self identification circuitry to self identify the memory chip. The self identification circuitry is to determine a resistance of a resistor and correlate the memory chip's identity to the resistance. A registering clock driver (RCD) chip is described. The RCD chip includes a controller. The controller is to receive provisional IDs (PIDs) from memory chips on a same memory module as the RCD chip. The controller is to program the memory chips with respective logical IDs (LIDs) based on a correlation of the PIDs and the LIDs.

20 Claims, 13 Drawing Sheets

(56) References Cited

OTHER PUBLICATIONS

Starting on p. 5, paragraphs [0012] through paragraph [0021] only of the non-published U.S. Appl. No. 17/747,950, filed May 18, 2022, pp. 5-7.
Extended European Search Report for Patent Application No. 23167698.2, Mailed Jan. 10, 2024, 12 pages.

* cited by examiner

| | PDA Address As Specified By Host (LID) | PDA Reinterpreted By RCD | |
|---|---|---|---|
| | | Upper Row | Lower Row |
| Targeted memory chip in upper row | 0000 | 0000 | 1000 |
| | 0001 | 0001 | 1001 |
| | 0010 | 0010 | 1010 |
| | 0011 | 0011 | 1011 |
| | 0100 | 0100 | 1100 |
| Targeted memory chip in lower row | 1000 | 1000 | 0000 |
| | 1001 | 1001 | 0001 |
| | 1010 | 1010 | 0010 |
| | 1011 | 1011 | 0011 |
| | 1100 | 1100 | 0100 |

Fig. 5a

| Pinout | Type |
|---|---|
| SDA/LBDQ | Input/Output |
| SCL/LBDQS | Input/Output |
| LSA (option 2) | Input |
| ZQ (option 1) | Input/Reference |

PDA Correlation By RCD

| | PDA Address As Specified By Host (LID) | PID |
|---|---|---|
| Targeted memory chip in upper row | 0000 | XXX1 |
| | 0001 | YYY2 |
| | 0010 | ZZZ3 |
| | 0011 | XXX2 |
| | 0100 | YYY3 |
| Targeted memory chip in lower row | 0101 | ZZZ1 |
| | 0110 | XXX3 |
| | 0111 | YYY1 |
| | 1000 | ZZZ2 |
| | 1001 | XYZ1 |

Fig. 6a

APPARATUS AND METHOD FOR PER MEMORY CHIP ADDRESSING

FIELD OF INVENTION

The field of invention pertains to the electronic arts, and, more, specifically, to an apparatus and method for per memory chip addressing.

BACKGROUND

As the role of memory in computing systems continues to expand in importance, engineers are constantly seeking ways to improve the functionality of memory devices and the ability of host systems to communicate with them, while, diminishing the overhead of such functionality and communication.

FIGURES

Figure 5B:
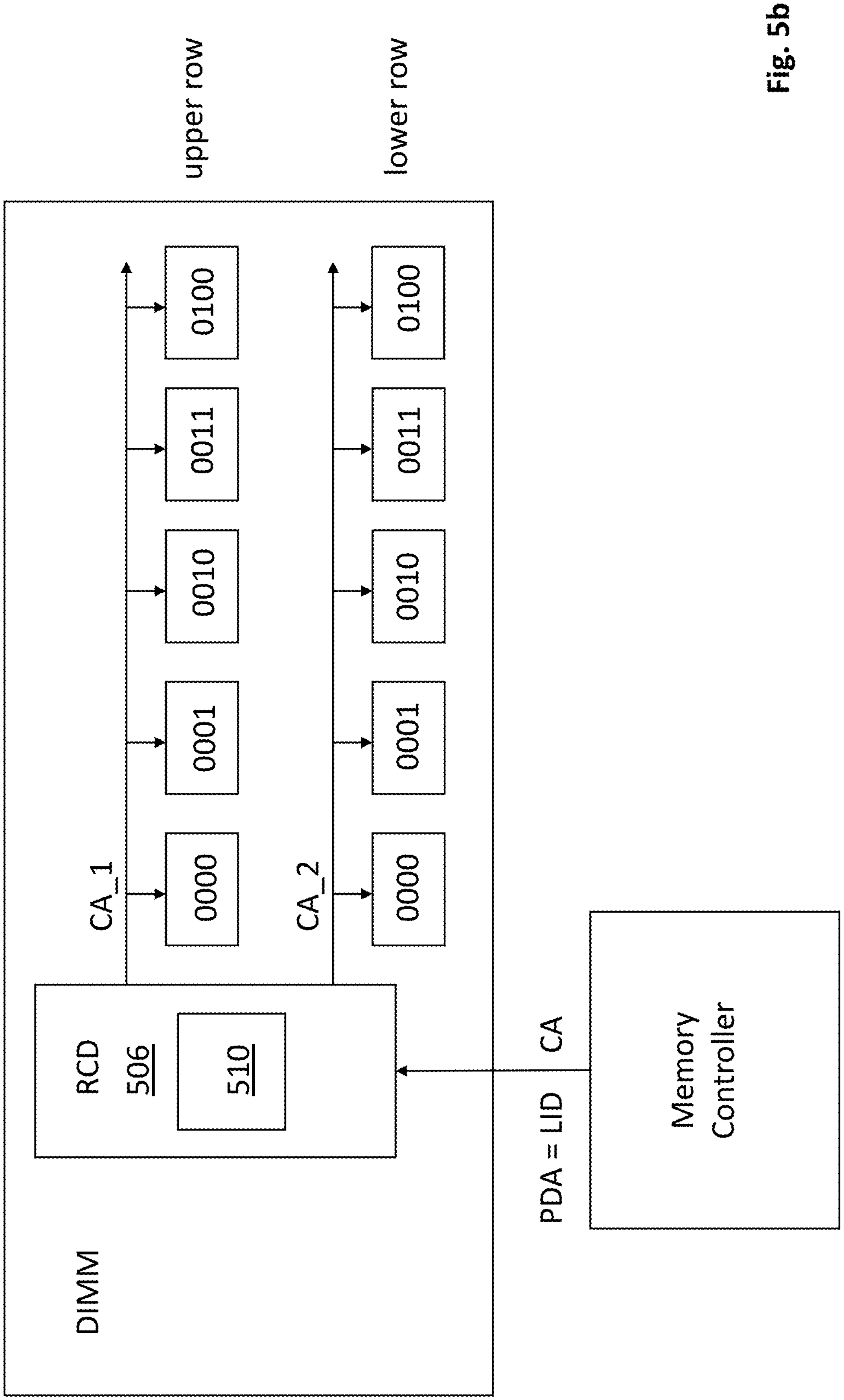
Figure 5C:
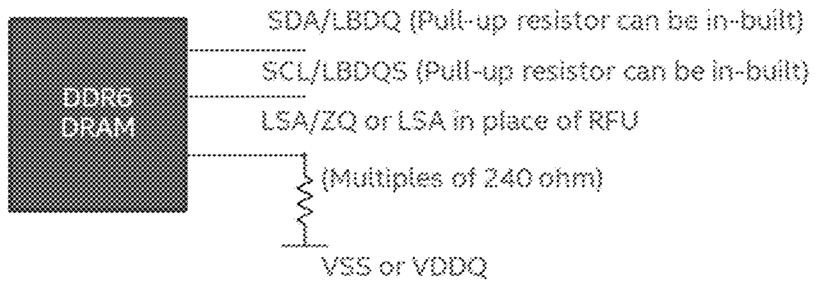
Figure 6B:
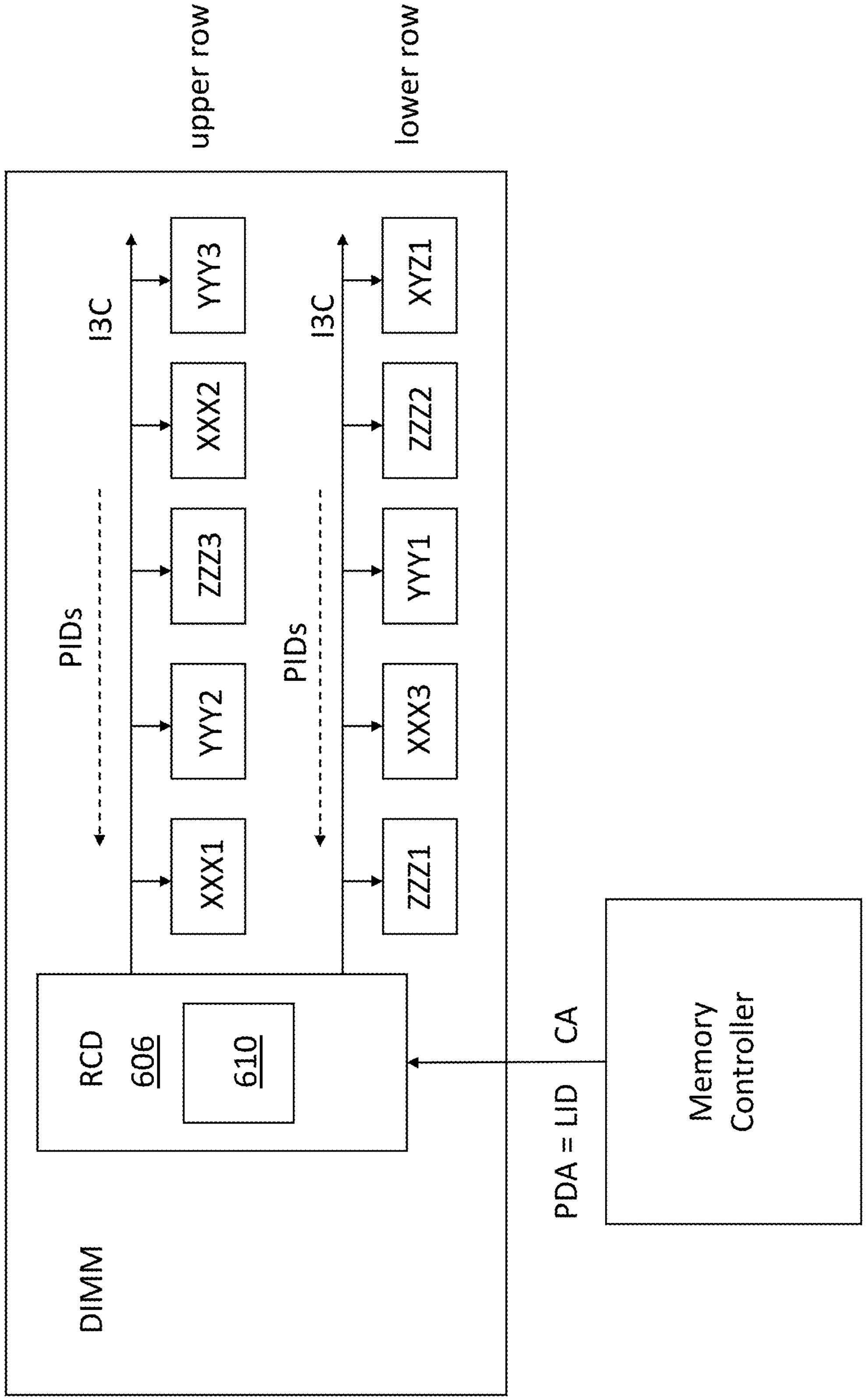
Figure 6C:
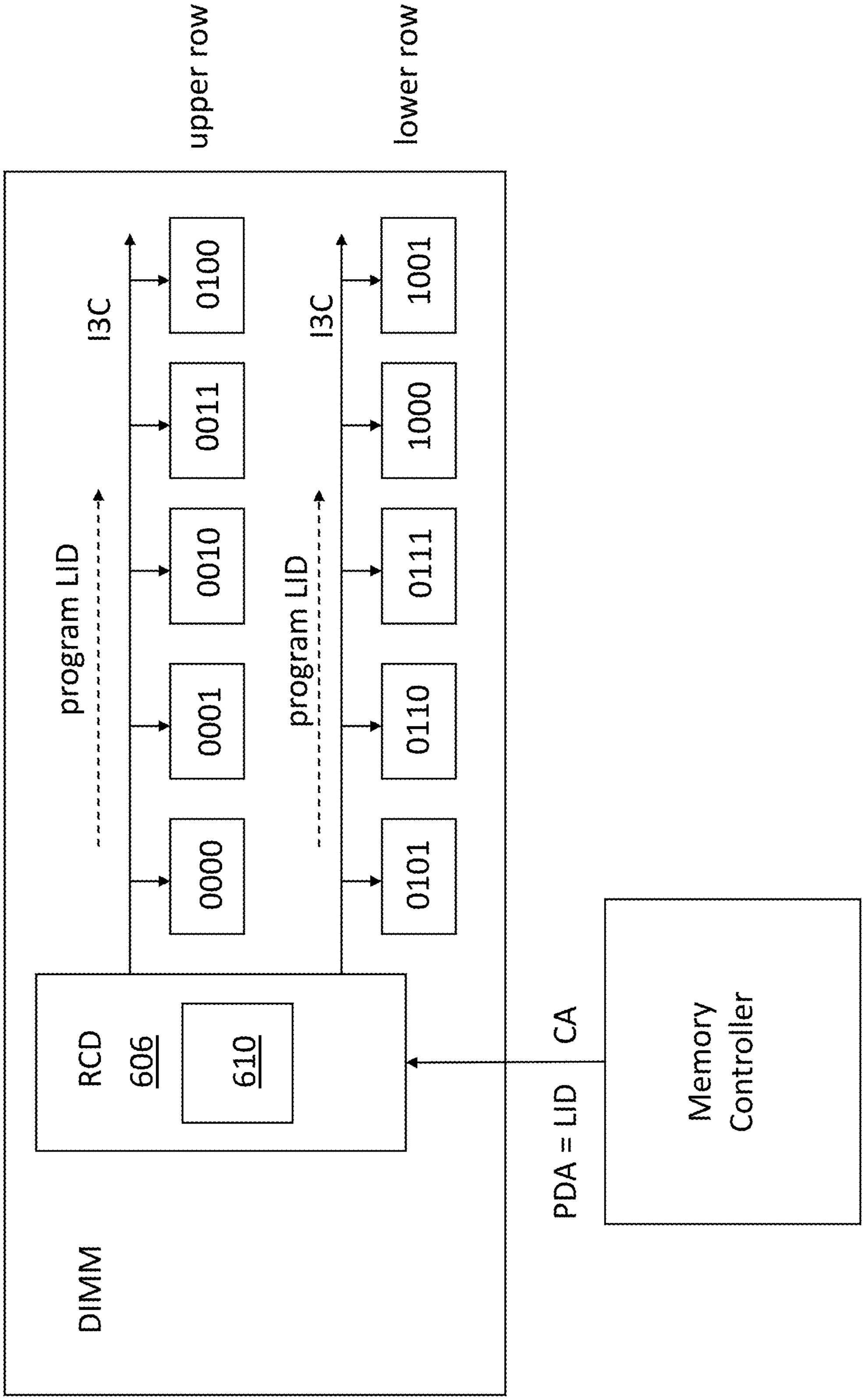
Figure 7:
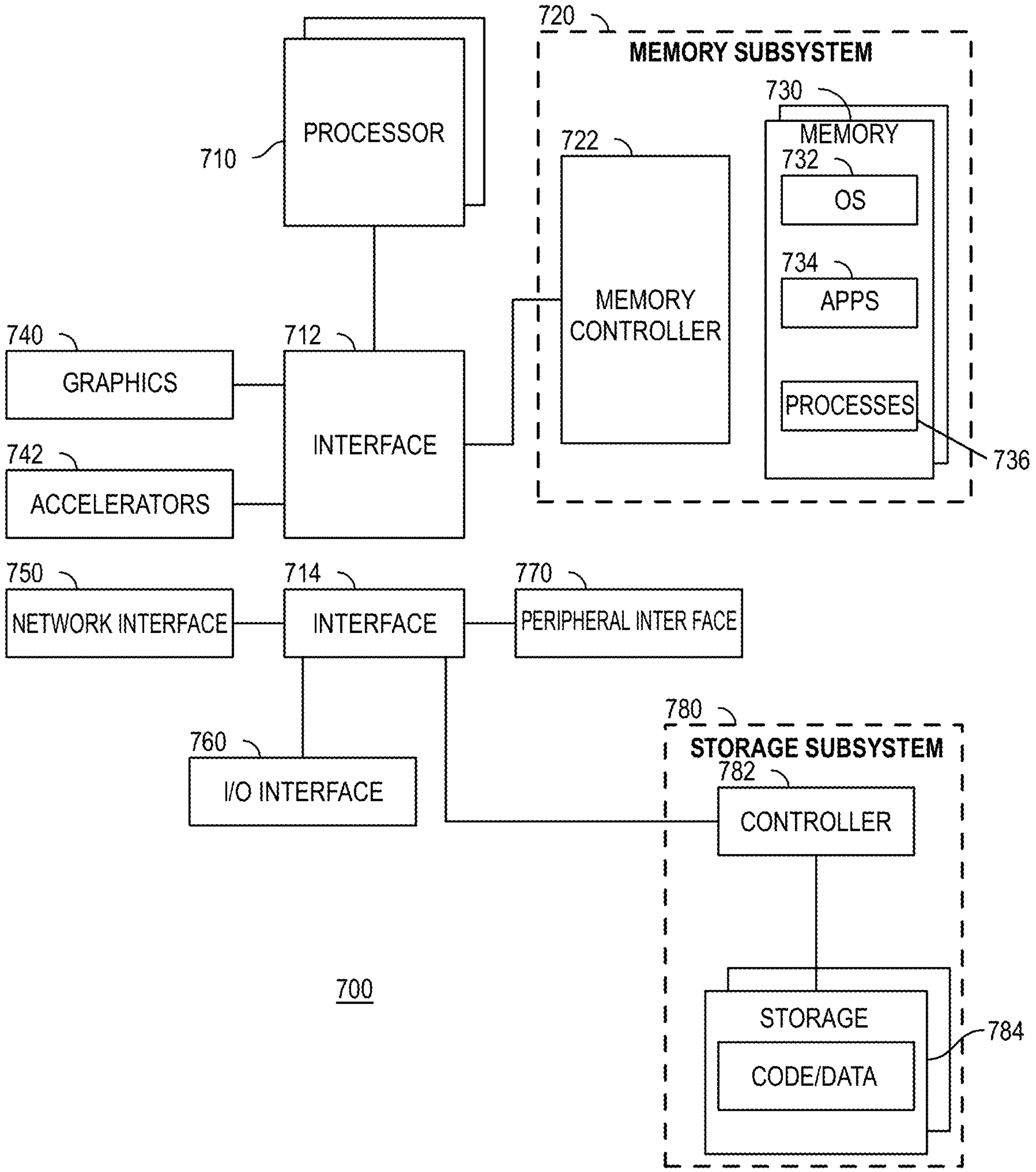
Figure 8:
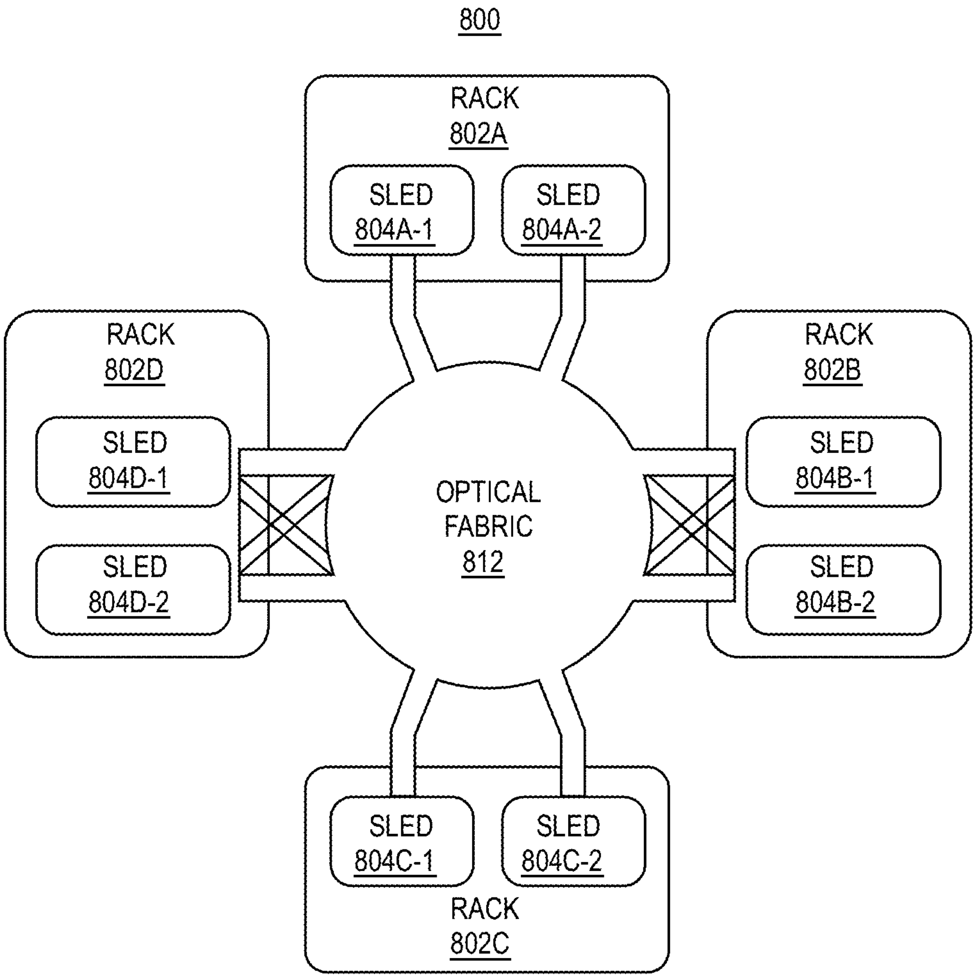
Figure 9:
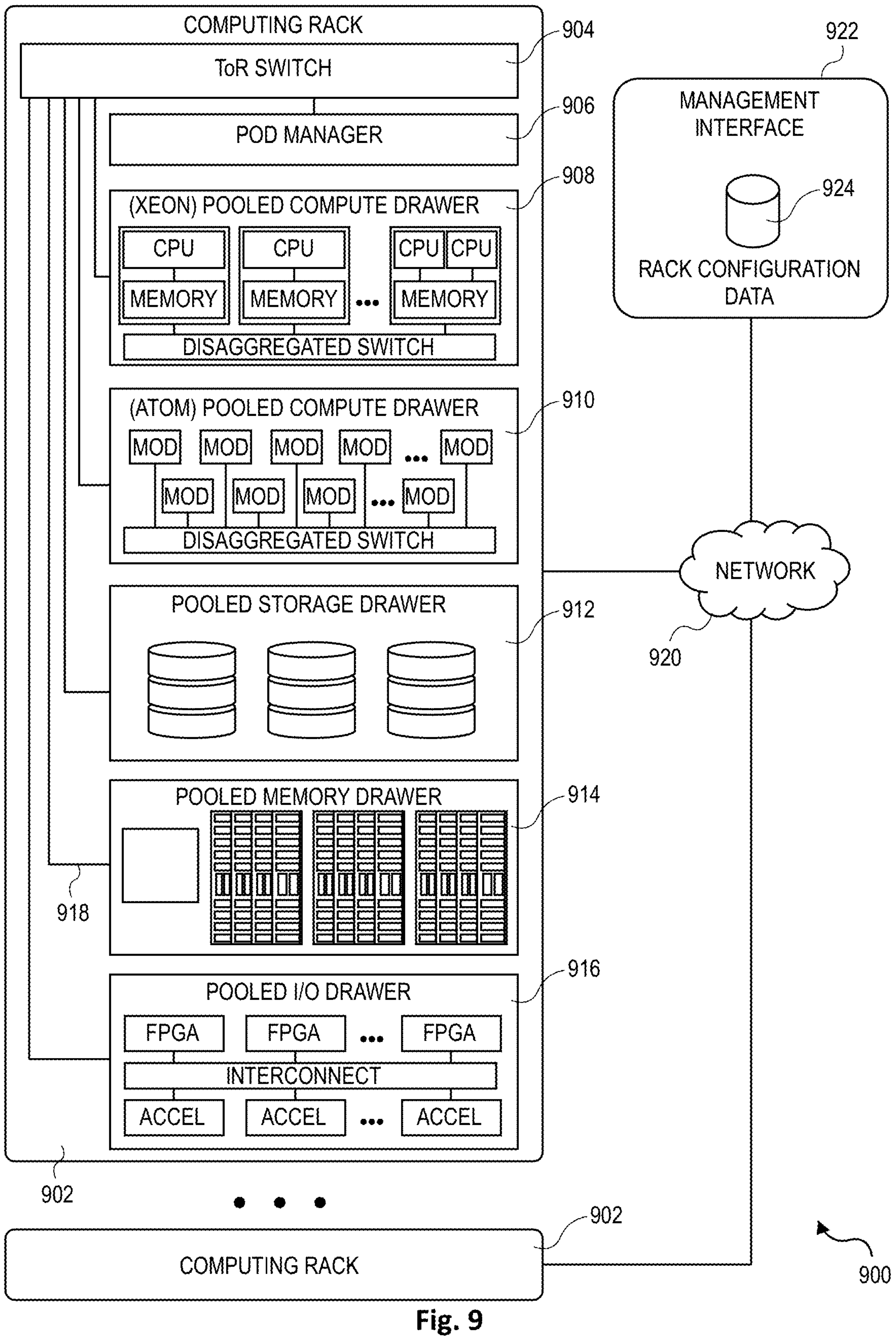

FIGS. 5*a*, 5*b* and 5*c* pertain to a first DIMM memory chip self enumeration approach;

FIGS. 6*a*, 6*b* and 6*c* pertain to a second DIMM memory chip self enumeration approach;

FIG. 7 shows an electronic system;

FIG. 8 shows a data center;

FIG. 9 shows a rack.

DETAILED DESCRIPTION

Recent Joint Electron Device Engineering Council (JEDEC) dual data rate memory standard publications (e.g., DDR5, DDR4, etc.) describe impedance calibration and per DRAM addressability (PDA) functions that memory chips that comply with these standards are expected to include.

With respect to impedance calibration, memory chip data output driver circuits are designed to be programmed to any of a number of precise, pre-established output driver impedances (e.g., 48 ohms, 34 ohms, 20 ohms, etc.). As observed in FIG. 1, the output driver circuit 101 includes a number of precision 240 ohm impedance blocks 102, 103 arranged in parallel for both pull-up and pull-down driver states.

For both pull-up and pull-down driver states, a specific source impedance is effected by enabling a specific number of the parallel 240 ohm impedance blocks 102, 103. For example, to effect a 48 ohm source impedance in the pull-up state, four of the 240 ohm pull-up impedance blocks 102 are enabled while the remainder of the pull-up impedance blocks are disabled (e.g., five enabled 240 ohm impedances in parallel forms a 48 ohm impedance, seven enabled 240 ohm impedances in parallel forms a 34 ohm impedance, etc.).

Before driver pull-up impedance can be precisely programmed, however, the 240 ohm impedance pull-up blocks 102 must be calibrated. As such, the memory chip also includes a "ZQ" pull-up calibration circuit 104. The ZQ pull-up calibration circuit 104 is a 240 ohm pull-up impedance block like the pull-up impedance blocks 102 in the driver circuit. The calibration pull-up impedance block 104 is coupled to an external precision 240 ohm resistor 105 that, e.g., a memory module manufacturer solders to a circuit board wire that is coupled to an output pin of the memory chip that is coupled to the calibration pull-up impedance block 104.

Figure 1:
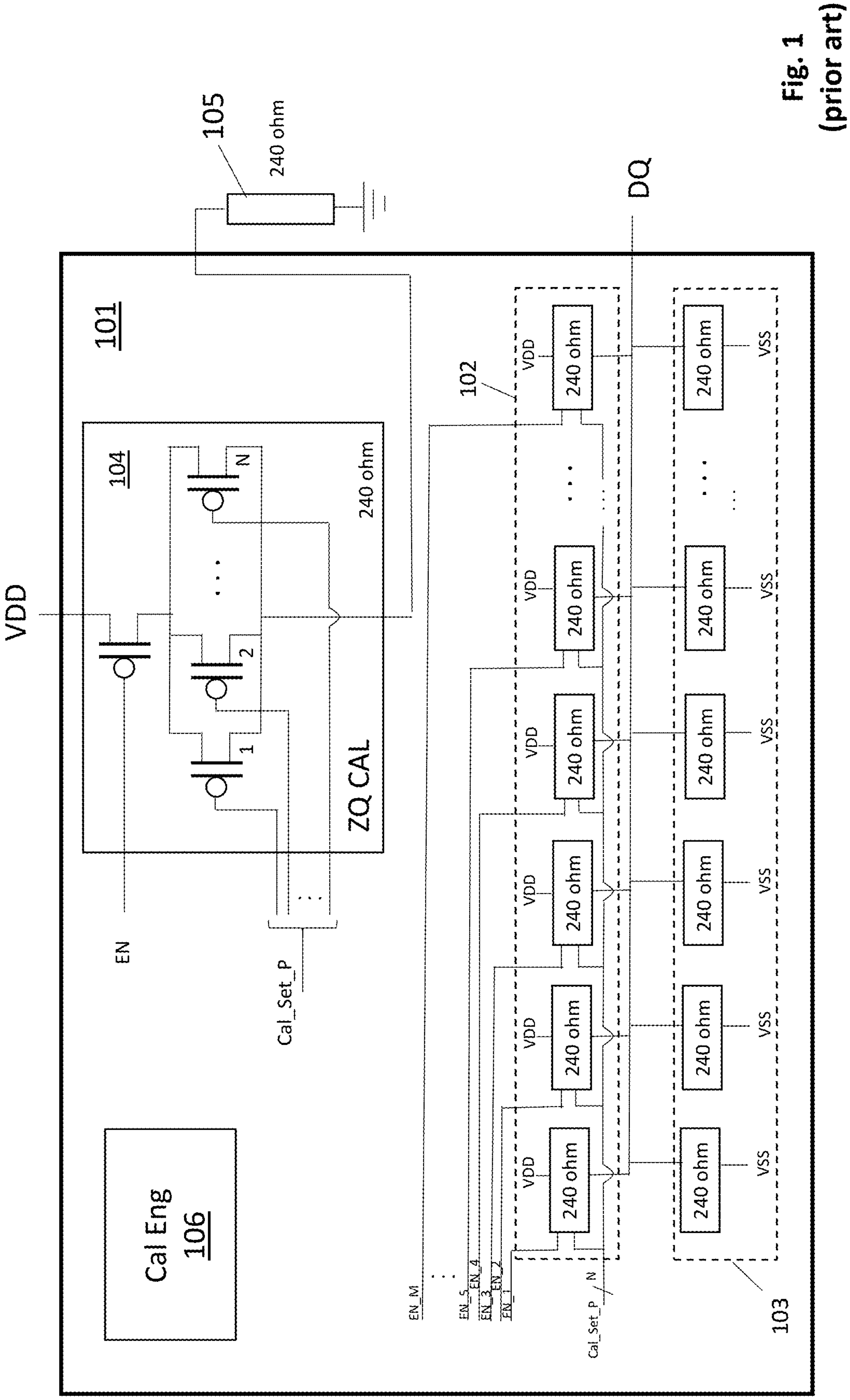
Fig. 1 (prior art)
FIG. 1 shows a driver circuit (prior art)

As observed in FIG. 1, the calibration pull-up impedance block 104 includes a number of P type transistors in parallel. During calibration, a voltage $V_{DD}$ is applied to the node of the pull-up calibration impedance block 104 that is opposite the node that is coupled to the precision resistor 105. A calibration engine circuit 106 then determines how many of the transistors within the calibration pull-up impedance block 104 need to be enabled in order to observe a voltage of $V_{DD}/2$ across the precision resistor 105 (when a voltage of $V_{DD}/2$ is observed across the precision resistor 105, the pull-up calibration impedance block 104 has a 240 ohm impedance).

This number of transistors are then enabled in each of the 240 pull-up impedance blocks 102 in the driver circuit 100. The number of 240 pull-up impedance blocks 102 needed to implement the desired pull-up source impedance (e.g., 48 ohms, 34 ohms, 20 ohms, etc.) are then enabled.

A similar process then ensues with the driver's pull-down impedance blocks 103. In that case, a calibration pull-down impedance block (not shown in FIG. 1) composed of N type transistors is used to determine how many N type transistors need to be enabled to effect a 240 ohm pull-down impedance. The determined number of N type transistors is then enabled in the pull-down impedance blocks 103 (wiring not depicted in FIG. 1). The correct number of 240 pull-down impedance blocks 103 is then enabled to effect the desired pull-down impedance (wiring also not depicted in FIG. 1).

Figure 2:
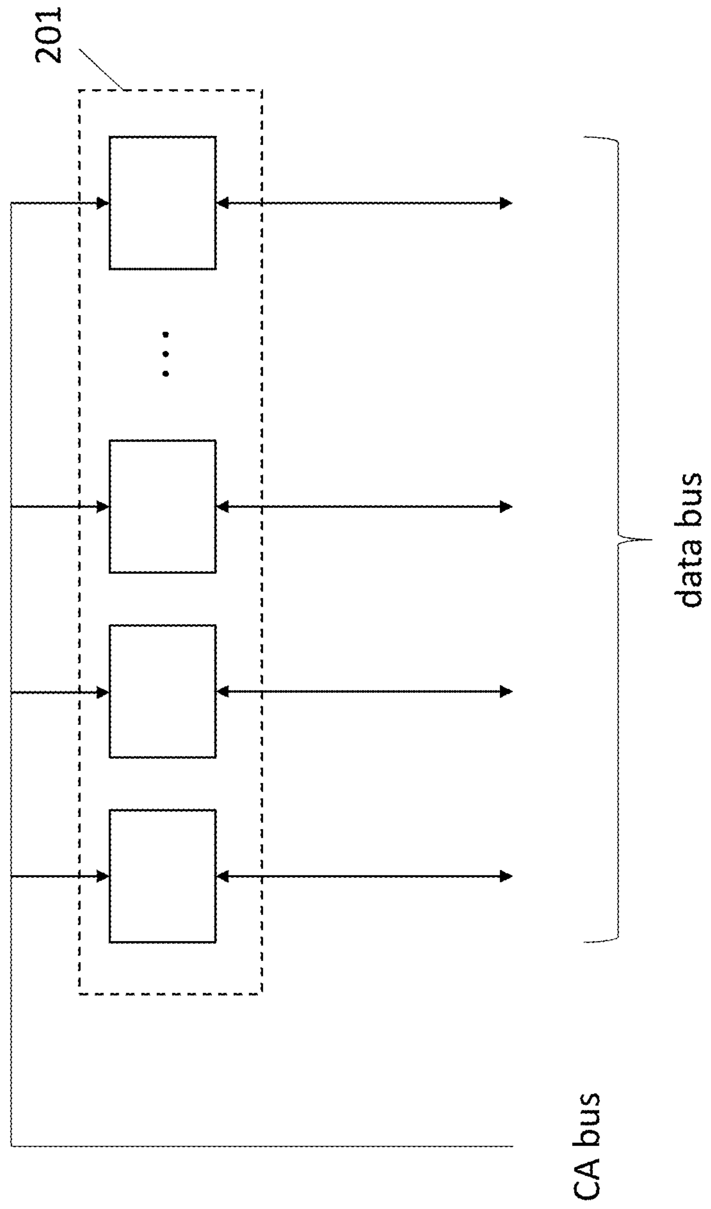
Fig. 2 (prior art)
FIG. 2 shows a portion of a memory channel (prior art)

PDA is a communication mechanism that allows a host (e.g., memory controller) to communicate with a specific memory chip that is coupled to the host by way of a memory channel. Here, referring to FIG. 2, the memory channel includes a data bus having a width of N bits (e.g., 40 bits) but the individual memory chips 201 themselves have much shorter data widths (e.g., four bits ("X4") or eight bits ("X8")). As such, multiple memory chips 201 are used to form a full rank of memory for a particular memory channel (e.g., eight X4 memory chips or five X8 memory chips are used to effect a 40 bit data bus).

The PDA function allows the host to communicate with any one memory chip specifically. Here, each memory chip is assigned its own identification (ID). To communicate with a particular memory chip, the host sends a message on the command and address (CA) portion of the memory channel that includes the identifier of the specific memory chip that it wants to communicate to. A memory chip having the particular ID observes its ID in the CA message and recognizes that it is the intended target of the host communication. The other memory chips of the memory channel have a different ID and ignore the host communication.

Before a host can communicate with a specific memory chip by way of the PDA function, however, the memory chips must be programmed with their own respective ID (a process referred to as "PDA enumeration"). When performing PDA enumeration according to existing JEDEC standards (e.g., DDR5), the memory chips 201 are not only programmed serially (one after the other) but also the data bus is used during the programming sequence (e.g., the data bus wires that are coupled to the specific chip being programmed are used to transfer the chip's ID to the chip, and/or, notify the chip that it is the target of the ID that is present on the CA portion of the memory channel).

Unfortunately, because of the large number of memory chips that are integrated on a memory module (such as a dual-in line memory module (DIMM)) the time consumed by the serial PDA enumeration process is extensive. Worse yet, the data bus is "off limits" during the PDA enumeration (because PDA enumeration uses the data bus) and cannot be used for other purposes during PDA enumeration.

Figure 3:
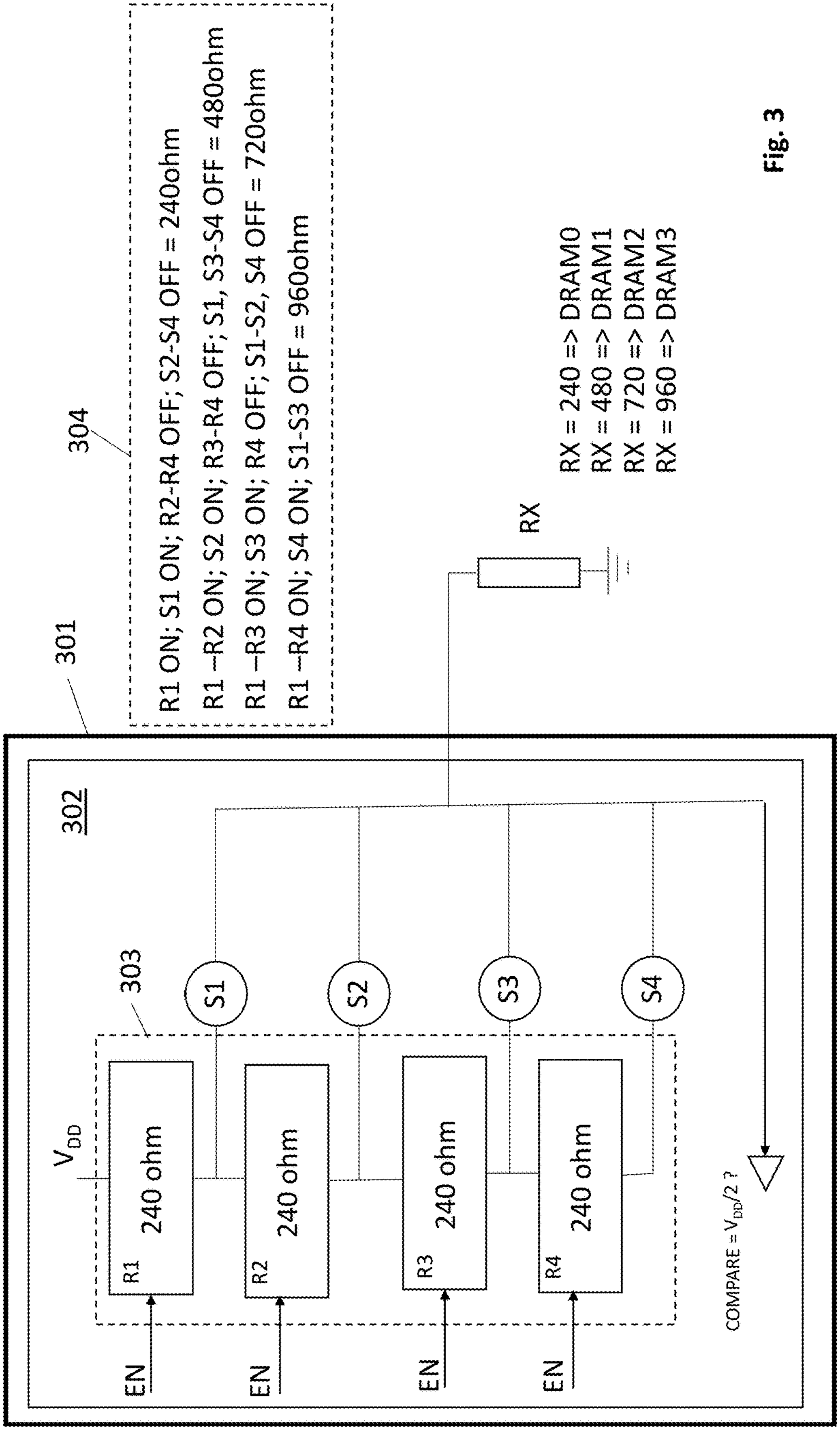
FIG. 3 shows an embodiment of a self ID enumeration circuit.

A first solution to the PDA enumeration problems, as observed in FIG. 3, is to correlate a memory device's PDA ID to a precision resistor RX that is coupled to an I/O pin of the memory chip. Here, different memory chips, e.g., on a same memory module, are coupled to respective external resistors having different resistances. The memory chips sense the resistance of their particular external resistor RX and correlate it to an ID to be used in PDA communications from the host.

Because the external resistances are different for the different memory chips, the IDs for the different memory chips are different, thereby allowing the host to delineate amongst the memory devices and uniquely identify and one of them. Likewise, each memory chip recognizes its own ID when the host uses it to communicate with the memory chip. Essentially, the memory chips enumerate themselves, e.g., in parallel and without use of the data bus, thereby eliminating the aforementioned problems with traditional PDA enumeration.

FIG. 3 shows an embodiment of a memory chip 301 having an ID detection circuit 302 that can measure the resistance of the external resistance and perform the correlation as described above. As observed in FIG. 3, the circuit includes a series of 240 ohm impedance blocks 303. In an embodiment, the 240 ohm impedance blocks 303 are the same as or similar to the 240 ohm impedance blocks that are used in the memory chip's output driver circuits as described above with respect to FIG. 1.

Here, the external resistance RX is selected from a set of possible resistance values that the ID detection circuit 303 is designed to detect. For example, according to one embodiment, the set of possible resistance values is 240 ohm, 480 ohm, 720 ohm and 960 ohm. As described in more detail below, in further embodiments, the particular one of these resistance values that is chosen for any particular memory chip is based on the physical location of the memory chip on a memory module such as a DIMM.

The ID detection circuit 303 is designed to detect the resistance of the external resistance RX by sequentially enabling the 240 ohm impedance blocks (one-by-one) until a looked-for voltage is observed across the external resistor RX. In particular, a voltage of $V_{DD}$ is applied to the opposite end of the impedance block chain than the end of the chain that is coupled to the external resistor. The ID detection circuit 303 then enables the individual 240 ohm impedance blocks one-by-one until a voltage of $V_{DD}2$ is observed across the external resistor RX.

Here, if the external resistance RX is 240 ohm, the voltage across the external resistance RX will be $V_{DD}/2$ after the first 240 ohm impedance block is enabled. If the external resistance RX is 480 ohm, the voltage across the external resistance RX will not be $V_{DD}/2$ after the first impedance block is enabled (it will be $(2V_{DD})/3$). As such, the circuit 303 will enable the second 240 impedance block which puts both enabled blocks in series thereby forming a 480 ohm impedance through them. As such, after the second impedance block is enabled the ID detect circuit 303 will detect the looked-for voltage ($V_{DD}/2$) across the external resistor RX.

In an embodiment, the memory chip ID detect circuit 303 takes the memory chip's ID to be equal to the number of 240 ohm impedance blocks that were enabled in order to obtain the looked-for voltage across the external resistor RX. Thus, in the former example above, the ID detect circuit 303 understands the memory chip's ID to be equal to 1 (0001). By contrast, in the later example above, the ID detect circuit 303 understands the memory chip's ID to be equal to 2 (0010).

In cases where the external resistor RX has a resistance of 720 ohm, the ID circuit 303 will enable three of the impedance blocks in series to observe the looked-for voltage and therefore recognize the memory chip's ID as being equal to 3 (0011). In cases where the external resistor RX has a resistance of 960 ohm, the ID circuit 303 will enable four of the impedance blocks in series to observe the looked-for voltage and therefore recognize the memory chip's ID as being equal to 4 (0100).

In another embodiment, the ID is taken to be one less than the number of enabled impedance blocks so that self enumeration values are in the range of 0 to 4 rather than 1 to 5. For example, a memory chip that senses an external resistance of 480 ohms will assign itself an ID of 1 ((((# of enabled blocks=2)−1)=1)).

Referring to the circuit of FIG. 3, enabling any particular number of the impedance blocks includes the appropriate settings of switches S1-S6 to effect the series arrangement of the correct number of enabled blocks from the $V_{DD}$ node to the external resistance node. These are observed in inset 304 of FIG. 3. Note that an ID=5 can be realized if an external resistance RX is simply not connected to the circuit. In this case, the observed voltage at the I/O pin remains at $V_{DD}$ throughout the sequential enabling of the impedance blocks. After the fourth impedance block is enabled and the looked for voltage remains unobserved, the ID detect circuit will recognize that its ID is 5 (0101), or, 4 if the ID circuit is designed to subtract 1 from the number of enabled blocks to observe the looked-for voltage when determining its ID.

It is pertinent to distinguish between the JEDEC PDA scheme by which the host can target any particular memory device on a memory channel for individual communication and the "PDA enumeration" sequence that establishes the memory chip addresses before any such PDA communication can take place. The above described solution is directed to the PDA enumeration process. However, notably, traditional JEDEC addressing schemes reserve four bits of PDA address so that up to sixteen different devices (e.g., memory chips and data buffers) can be individually targeted on any memory channel. The above described self enumeration approach, as described, provides for five different addresses rather than sixteen.

Figure 4:
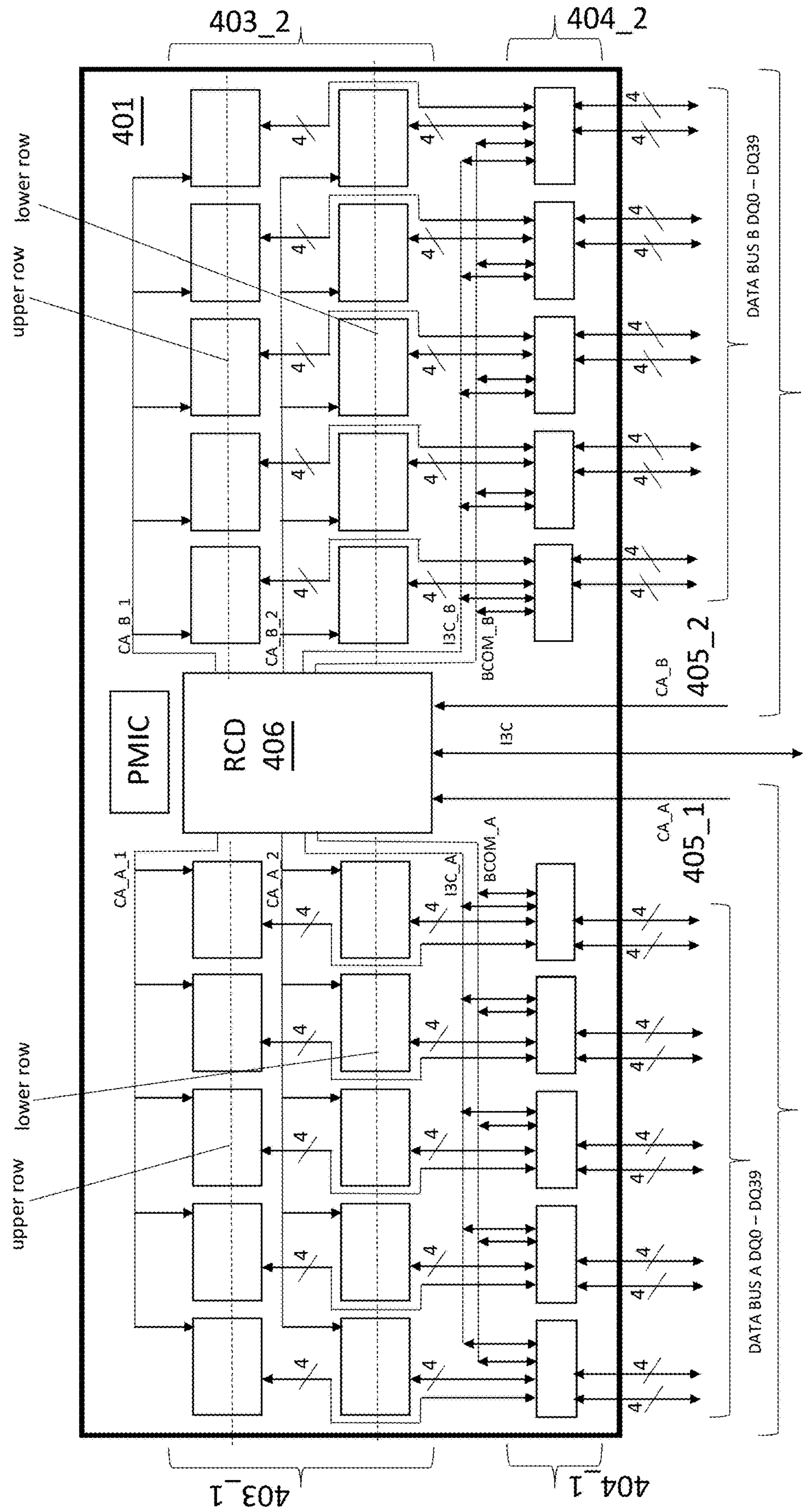
FIG. 4 shows an improved dual in-line memory module (DIMM)

FIG. 4 therefore shows an overview of a side of a DIMM 401 having typical memory chip and data buffer layouts for DDR5 and, potentially, DDR6 and other future JEDEC DDR compliant DIMMs.

As observed in FIG. 4, a first "A" memory channel 402_1 is coupled to the left hand side of the DIMM 401 and a second "B" memory channel 402_2 is coupled to the right hand side of the DIMM 401. A rank of memory chips 403_1 and corresponding data buffers 404_1 for the A memory channel 402_1 are therefore disposed on the left hand side of the DIMM 401 while another rank of memory chips 403_2 and corresponding data buffers 404_2 for the B memory channel 402_2 are disposed on the right hand side of the DIMM 401.

In the particular embodiment of FIG. 4, the data bus for both memory channels 402_1, 402_2 is 40 bits in which 32 bits is for customer data and 8 bits is for error correction code information. The 40 bit data bus width requires ten X4 memory chips that is realized, for both memory channels, with a first group of five memory chips that are located in an upper region or row and second group of five memory chips that are located in a lower region or row.

Each memory channel also includes its own respective command/address (CA) bus 405_1, 405_2. The CA bus for both memory channels is intercepted by the DIMM's central registering clock driver (RCD) chip (by contrast, a memory channel's data bus wires are coupled to corresponding data buffers 404_1, 404_2 on the DIMM 401 which are then coupled to the memory channel's rank of memory chips 403_1, 403_2).

The RCD 406 receives the CA signals for both memory channels (which are generated by the host (memory controller)) and, for each of the memory channels, redrives the channel's corresponding CA signals onto separate branches to the channel's data buffers 404 and memory chips 403. That is, the CA signals received for the first memory channel 402_1 are re-driven to the memory chips 403_1 and the data buffers 404_1 on the left hand side of the DIMM, whereas, the CA signals received for the second memory channel 402_2 are re-driven to the memory chips 403_2 and data buffers 404_2 on the right hand side of the DIMM 401.

Here, with two (upper and lower) rows of memory chips per rank 403_1, 403_2 of memory chips and with each row having five memory chips, the aforementioned ID detection circuit can be used whereby each memory chip is capable of identifying one of five different IDs for itself depending on the external resistance that has been coupled to it. In this case, the RCD 406 is responsible for converting memory chip IDs specified by the host (e.g., 0 through 9) into IDs designed for each row (e.g., 0 through 4).

FIGS. 5*a* and 5*b* therefore shows an embodiment of a scheme for assigning logical IDs (LIDs) to memory chips on a DIMM for PDA purposes where the modulo of the chips' self enumeration technique, as described above with respect to FIGS. 3 and 4, is less than what the applicable PDA scheme provides for (e.g., as described above, the JEDEC PDA specifies four bits allowing for unique definition of sixteen different chips but the memory chips themselves are only capable of recognizing five different addresses during PDA enumeration).

According to the scheme of FIGS. 5*a* and 5*b*, the PDA address specified by the memory controller on the CA bus of a particular one of the memory channels, adopts a logical ID (LID) scheme in which the upper bit of the four PDA bits is used to signify whether the targeted device is in the upper row or lower row for the memory channel's particular rank of memory chips on the DIMM. Memory chips within a same row (upper or lower), having limited self enumeration modulo, only use the lower three bits of the PDA address (from their perspective, e.g., the highest ordered bit is always 0).

The RCD chip 506 has reinterpretation logic 510 that, upon receiving the PDA address within the CA signals sent from the host, redrives the lowest ordered bits in the PDA address upon the CA branch of the row that the upper bit of the PDA identifies and clamps the upper PDA bit to 0. By so-doing, the targeted memory chip will recognize its PDA address on its CA wires. With respect to the memory chips that are not along the targeted row, the RCD chip's reinterpretation logic 510 either does not send any PDA communication along their corresponding CA branch, or, redrives the lowest PDA bits as described above but clamps the highest PDA bit to 1 so that none of the memory chips within the non targeted row will recognize an address that matches their own.

In essence, the host can specify a PDA address in the LID syntax of [upper/lower];[chip ID] where the upper component [upper/lower] (e.g., the highest ordered bit in a four bit PDA address) identifies whether the targeted memory chip is in the upper or lower row of the DIMM and the lower component [chip ID] is the ID of the targeted memory chip that the memory chip self enumerated for itself.

In another embodiment that is similar to the approach above, the resistance value that a memory chip senses to self enumerate itself is not external from the memory chip's package (it is integrated within the memory chip, or at least the memory chip's package). Here, memory chip manufacturers can manufacture different memory chips with different internal resistance (e.g., 240 ohm, 480 ohm, 720 ohm, 960 ohm).

Regardless of whether the resistance used to self enumerate is external or internal, in various embodiments, memory chip's location along its row on the DIMM determines the self enumerate resistance that is used. For example, for any group of five memory chips within a same row of the DIMM, memory chip "0" having 240 ohm resistance is closest to the RCD, memory chip "1" having 480 ohm resistance is next to memory chip "0" farther away from the RCD, . . . and memory chip "4" having a resistance greater than 960 ohm is farthest from the RCD along the row.

In cases where the memory chips themselves are manufactured from a same manufacturing process and mask set, the internal resistance can be established, e.g., with a chip resistor that is internal to the package but outside the memory chip.

FIG. 5*c* shows additional details for other possible embodiments where a memory chip's LID is taken from a resistance value that is coupled to the memory chip (such embodiments can be used whether a modulo limitations as discussed above with respect to FIGS. 6*a* and 6*b* just above exists or not). FIG. 5*c* shows a portion of a memory chip's pinouts.

According to the approach of FIG. 5*c*, the functionality of either or both of the data (DQ) and data strobe (DQS) loopback pins LBDQ, LBDQS on a memory chip are enhanced for resistance value based self enumeration ID (SDA, SCL).

Traditionally the loopback pins LBDQ, LBDQS on a memory chip were output only pins that streamed the DQ and DQS signals back to the host. In the improved approach of FIG. 5*c*, these pins are enhanced to be coupled to circuitry such as the self enumeration circuitry of FIG. 3 (or other resistance value detection circuitry) and a resistor whose resistance value determines the memory chip's ID. Technically, the measurement of the resistance value from either or both of these pins acts like an input back to the memory chip. The resistor can be external from the memory chip package or internal within the memory chip package.

In the particular embodiment of FIG. 5*c*, there are two options for self enumeration using a resistor coupled to the memory chip. Option 1 uses the nominal output driver ZQ impedance calibration pin not only to calibrate the impedance of the output drivers but also determine the memory chip's ID (thus the ZQ calibration circuitry is enhanced to include self identification and/or is coupled to self identification circuitry). Option 2 couples the resistor that determines the memory chip's ID to either or both of the loopback pins. Another pin (e.g., the pin currently specified as RFU on an X16 DDR5 chip) is tied to high or low to establish which of the options is to be used.

Although embodiments above have stressed the use of a resistor and the measurement of the resistor's resistance as a determinant of a memory chip's ID, in other embodiments other passive components (e.g., capacitors, inductors) could be used instead of or in combination with a resistor. For example, a self identification circuit could include a current source circuit that drives a current through a capacitor or resistor-capacitor (RC) circuit, and, a voltage detection circuit that measures how quickly (e.g., as a count of clock cycles) a voltage on the capacitor or within the RC circuit rises, where, the memory ID is correlated to the measured time span. As such, the teachings above can be extended to self identification circuits that measure a property of one or more (e.g., passive) components that is/are coupled to and/or integrated within the memory chip to help establish the memory chip's ID. The one or more components can be entirely outside the memory chip's package, partially within and partially outside the memory chip's package, or entirely within the memory chip's package.

In yet another approach, referring to FIGS. 6*a*, 6*b* and 6*c*, rather than have the memory devices determine their own ID from a static resistance as described above at length, the memory devices and an I3C controller 610 within the RCD 606 are designed to use the memory devices own provisioned ID (PID) at least as an initial memory device ID during bring-up of the DIMM that the memory devices are disposed upon.

Here, a PID is a mechanism for target chips (e.g., memory chips) that are coupled to an I3C bus to self identify themselves according to a manufacturer ID (special ID assigned to the manufacturer of the memory chip) and a serial number ID (special ID assigned to the memory chip by the manufacturer of the memory chip). The precise scheme for the PID is defined by the MIPI Alliance which promulgates the I3C standard.

According to this approach, referring to FIG. 6*a*, the DIMM manufacturer records the PID of each memory chip on the DIMM and correlates it to a unique logical ID (LID) that is also assigned to the memory chip. Here, the LID can take the form of the PDA address used by the host which, e.g., as observed in FIG. 6*a*, simply assigns addresses in increasing numerical order without reference to an upper or lower memory chip row.

The correlation is then shipped with the DIMM, e.g., as part of the DIMM's serial presence detect (SPD) information. SPD information is commonly disposed on a non volatile memory (e.g., flash) within the computer or other electronic system that the DIMM is installed into. SPD is often part of the system's BIOS or other data set used during system and/or DIMM bring-up. Here, when the DIMM is installed in a system, the IC3 controller 610 of the RCD 606 reads (or is otherwise provided) the PIDs of the respective memory chips directly over the I3C bus/busses that couple the RCD 606 to the memory chips. The RCD 606 is also presented with the aforementioned correlation from the manufacturer, e.g., from the DIMM's SPD information. By comparing the directly read PIDs with the SPD information, the RCD 606 can determine which PID corresponds to which LID.

Once the RCD 606 understands which PID corresponds to which LID, referring to FIG. 6*c*, the I3C controller 610 on the RCD 606 can directly assign/program addresses to each memory chip that are consistent with, e.g., an LID/PDA addressing scheme that does not have a special syntax that includes a target chip row component. As such, the RCD 606 need not manipulate the highest ordered bit of subsequent PDA addresses sent by the host over the CA bus as discussed above with respect to FIGS. 5*a* and 5*b*. Rather, because the I3C controller 610 has directly assigned the PDA addresses to the memory chips that the memory controller will use to identify them, the RCD 606 simply redrives the PDA addresses it receives from the memory controller onto the backside CA channels that are coupled to the memory chips.

I3C busses are typically used for transporting control information at modest speed and are operational shortly after power on. As such, they are ideal for communicating BCOM training information between the RCD 206 and data buffers 204_1, 204_2 before the BCOM interface is fully operational. The precise functional characteristics of an I3C bus can be found in the MIPI I3C specification v.1.1.1 promulgated by the MIPI Alliance. Other, types of control busses, whether other versions of I3C or other busses promulgated by MIPI or any other type of control bus can be used instead of the particular I3C bus mentioned above.

Although the above described embodiments of FIG. 6*a,b,c* focused on the I3C control and correlation being performed by the RCD or otherwise on the memory module, in alternate embodiments the RCD and/or memory module are not involved in the I3C communications or the above described correlation. Rather the host system includes an I3C controller that is coupled to the I3C bus that the memory chips report their provisioned ID (PID) upon. The host system, e.g., the memory controller and/or an I3C controller on the host system and/or serial presence detect (SPD) logic circuitry on the host system, then correlates the memory chip PIDs to a logical address (LID) and programs the memory chips with their respective LIDs directly.

In various embodiments, the self identification circuit 302 of FIG. 3 is interwoven with a data bus or other driver circuit in the memory chip such that at least some of the 240 ohm impedance blocks have a dual purpose: self-identification and driver impedance. In essence the circuit of FIG. 3 is meshed with the circuit of FIG. 1 such that some of the 240 ohm blocks of FIG. 1 also correspond to the 240 ohm blocks of FIG. 3. Here, additional switches are added to the circuit of FIG. 3 to individual switch each 240 block between the circuit of FIG. 3 or the circuit of FIG. 1.

Although embodiments above have stressed a self enumeration circuitry that employs a series arrangement of 240 ohm blocks, in other embodiments, circuitry that determine a value of a resistor other than through a series arrangement of blocks (e.g., a parallel arrangement of blocks are enabled and then turned off on-by-one). Also, blocks other than 240 ohms can used. Likewise, other circuits can use blocks of different values (e.g., for a wider range of resistance detection), or some other resistance measurement circuitry that does not rely on impedance blocks (e.g., resistance is measured by driving a fixed current through the resistor with a current source circuit and measuring the voltage across the resistor). Thus the invention should be understood to be directed more generally to resistance measurement circuits rather than any particular kind of manner by which resistance is determined.

Although embodiments above have stressed implementations on DIMMs, other types of memory modules (e.g., stacked memory module solutions such as High Bandwidth Memory (HBM) also promulgate by JEDEC, memory module having memory chips other DRAM such as memory chips composed of three-dimensional, non-volatile, resistive memory cells that are byte addressable (e.g., Optane™ memory chips from Intel Corporation of Santa Clara, California).

The following discussion concerning FIGS. 7, 8, and 9 are directed to systems, data centers and rack implementations, generally. FIG. 7 generally describes possible features of an electronic system having memory chips with self enumeration capability as described at length above. FIG. 8 describes possible features of a data center that can include such electronic systems. FIG. 9 describes possible features of a rack having one or more such electronic systems installed into it.

FIG. 7 depicts an example system. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Certain systems also perform networking functions (e.g., packet header processing functions such as, to name a few, next nodal hop lookup, priority/flow lookup with corresponding queue entry, etc.), as a side function, or, as a point of emphasis (e.g., a networking switch or router). Such systems can include one or more network processors to perform such networking functions (e.g., in a pipelined fashion or otherwise).

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic circuitry, and programmable processing elements such as field programmable gate arrays (FPGAs). Accelerators 742, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), convolutional neural network, recurrent convolutional neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, volatile memory, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software functionality to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710. In some examples, a system on chip (SOC or SoC) combines into one SoC package one or more of: processors, graphics, memory, memory controller, and Input/Output (I/O) control logic circuitry.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory), JESD235, originally published by JEDEC in October 2013, LPDDR5, HBM2 (HBM version 2), or others or combinations of memory technologies, and technologies based on derivatives or extensions of such specifications.

Such memory solutions can include memory chips that self enumerate with self enumeration circuitry as described at length above.

In various implementations, memory resources can be "pooled". For example, the memory resources of memory modules installed on multiple cards, blades, systems, etc. (e.g., that are inserted into one or more racks) are made available as additional main memory capacity to CPUs and/or servers that need and/or request it. In such implementations, the primary purpose of the cards/blades/systems is to provide such additional main memory capacity. The cards/blades/systems are reachable to the CPUs/servers that use the memory resources through some kind of network infrastructure such as CXL, CAPI, etc.

The memory resources can also be tiered (different access times are attributed to different regions of memory), disaggregated (memory is a separate (e.g., rack pluggable) unit that is accessible to separate (e.g., rack pluggable) CPU units), and/or remote (e.g., memory is accessible over a network).

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), Cache Coherent Interconnect for Accelerators (CCIX), Open Coherent Accelerator Processor (Open CAPI) or other specification developed by the Gen-z consortium, a universal serial bus (USB), or an Institute of Electrical and Electronics Engineers (IEEE) standard 1394 bus.

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits in both processor 710 and interface 714.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base, and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Such non-volatile memory devices can be placed on a DIMM or memory module and self enumerate with self enumeration circuitry as described at length above.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented as a disaggregated computing system. For example, the system 700 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Although a computer is largely described by the above discussion of FIG. 7, other types of systems to which the above described invention can be applied and are also partially or wholly described by FIG. 7 are communication systems such as routers, switches, and base stations.

FIG. 8 depicts an example of a data center. Various embodiments can be used in or with the data center of FIG. 8. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. However, optical, wireless, and/or electrical signals can be transmitted using fabric 812. The signaling connectivity that optical fabric 812 provides to any given sled may include connectivity both to other sleds in a same rack and sleds in other racks.

Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

FIG. 9 depicts an environment 900 that includes multiple computing racks 902, each including a Top of Rack (ToR) switch 904, a pod manager 906, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 908, and INTEL® ATOM™ pooled compute drawer 910, a pooled storage drawer 912, a pooled memory drawer 914, and a pooled I/O drawer 916. Each of the pooled system drawers is connected to ToR switch 904 via a high-speed link 918, such as a 40 Gigabit/second (Gb/s) or 100 Gb/s Ethernet link or an 100+Gb/s Silicon Photonics (SiPh) optical link. In one embodiment high-speed link 918 comprises an 600 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 900 may be interconnected via their ToR switches 904 (e.g., to a pod-level switch or data center switch), as illustrated by connections to a network 920. In some embodiments, groups of computing racks 902 are managed as separate pods via pod manager(s) 906. In one embodiment, a single pod manager is used to manage all of the racks in the pod. Alternatively, distributed pod managers may be used for pod management operations. RSD environment 900 further includes a management interface 922 that is used to manage various aspects of the RSD environment. This includes managing rack configuration, with corresponding parameters stored as rack configuration data 924.

Any of the systems, data centers or racks discussed above, apart from being integrated in a typical data center, can also be implemented in other environments such as within a bay station, or other micro-data center, e.g., at the edge of a network.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

Some examples may be implemented using or as an article of manufacture or at least one computer-readable medium. A computer-readable medium may include a non-transitory storage medium to store program code. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the program code implements various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled, and/or interpreted programming language.

To the extent any of the teachings above can be embodied in a semiconductor chip, a description of a circuit design of the semiconductor chip for eventual targeting toward a semiconductor manufacturing process can take the form of various formats such as a (e.g., VHDL or Verilog) register transfer level (RTL) circuit description, a gate level circuit description, a transistor level circuit description or mask description or various combinations thereof. Such circuit descriptions, sometimes referred to as "IP Cores", are commonly embodied on one or more computer readable storage media (such as one or more CD-ROMs or other type of storage technology) and provided to and/or otherwise processed by and/or for a circuit design synthesis tool and/or mask generation tool. Such circuit descriptions may also be embedded with program code to be processed by a computer that implements the circuit design synthesis tool and/or mask generation tool.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software, and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences may also be performed according to alternative embodiments. Furthermore, additional sequences may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The invention claimed is:

1. A memory chip, comprising:

pins to couple to a command and address bus shared with multiple other memory chips; and self identification circuitry to self identify the memory chip with an enumeration ID (identifier) different from enumeration IDs of the other memory chips that share the command and address bus, the self identification circuitry to determine the enumeration ID of the memory chip based on a resistance of a resistor that indicates a relative position of the memory chip to an RCD (registering clock driver) compared to the other memory chips that share the command and address bus.

2. The memory chip of claim 1 wherein the enumeration ID of the memory chip is a per dynamic random access memory (DRAM) address (PDA) described in a Joint Electron Device Engineering Council (JEDEC) dual data rate standard.

3. The memory chip of claim 1 wherein the self identification circuitry comprises a plurality of impedance blocks and separately enables the impedance blocks to compare a voltage that exists between a series resistance of the impedance blocks and the resistor against a looked-for voltage.

4. The memory chip of claim 3 wherein the impedance blocks comprise 240 ohm impedance blocks.

5. The memory chip of claim 4 wherein the impedance blocks are also driver impedance blocks.

6. The memory chip of claim 1 wherein the resistor is to be external from the memory chip.

7. The memory chip of claim 1 wherein the resistor is within a package of the memory chip.

8. A controller device on a memory module, comprising:

an I3C controller to communicate individually with multiple memory chips that share a command and address bus on the memory module; and a memory device to store individual enumeration identifiers (IDs) for the multiple memory chips to indicate respective addresses that uniquely identify the memory chips on the command and address bus, wherein, the respective addresses indicate relative positions of the memory chips to an RCD (registering clock driver) compared to the others of the multiple memory chips that share the command and address bus.

9. The controller device of claim 8 wherein the memory module is a dual in-line memory module (DIMM) and the respective addresses are per DRAM addressability addresses (PDAs) described a Joint Electron Device Engineering Council (JEDEC) standard.

10. The controller device of claim 8 wherein the controller device comprises the RCD.

11. The controller device of claim 8 wherein the controller device comprises an SPD (serial presence detect) of the memory module.

12. The controller device of claim 8 wherein the controller device comprises a memory controller coupled to the memory module.

13. A computing system, comprising:

one or more processing cores;

a plurality of DIMMs (dual inline memory modules), at least one of the DIMMs comprising multiple memory chips that share a command and address bus, the memory chips having respective self identification circuits to self identify themselves with an enumeration ID (identifier) different from enumeration IDs of the others of the multiple memory chips that share the command and address bus during bring-up of the at least one of the DIMMs, the self identification circuits to determine respective enumeration IDs of the respective memory chips based on respective resistances of respective resistors of the memory chips that indicate relative positions of the respective memory chips to an RCD (registering clock driver);

a memory controller that is to communicate with the memory chips individually using respective addresses that include the respective enumeration IDs.

14. The computing system of claim 13 wherein the respective addresses further identify a respective row that a targeted one of the memory chips resides along on the at least one of the DIMMs.

15. The computing system of claim 13 wherein the self identification circuits comprise a plurality of impedance blocks and separately enables the impedance blocks to compare a voltage that exists between a series resistance of the impedance blocks and the resistor against a looked-for voltage.

16. The computing system of claim 15 wherein the impedance blocks comprise 240 ohm impedance blocks.

17. The computing system of claim 13 wherein the respective resistances are determined as a function of location on the at least one of the DIMMs.

18. The computing system of claim 13 wherein the resistors are external from the multiple memory chips.

19. The computing system of claim 13 wherein the resistors are within respective packages of the multiple memory chips.

20. The computing system of claim 13 wherein the respective addresses are per DRAM addressability addresses (PDAs) described a Joint Electron Device Engineering Council (JEDEC) standard.

* * * * *